Nov. 4, 1924.
P. H. WILKINSON
HOSE CLAMP
Filed Feb. 19, 1924
1,514,412
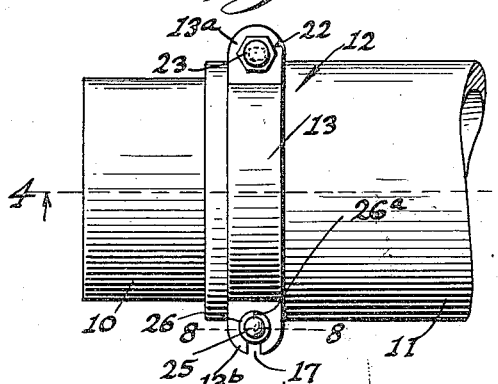
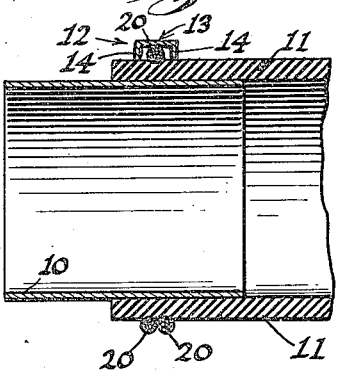
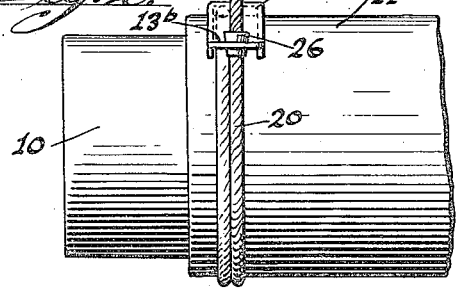
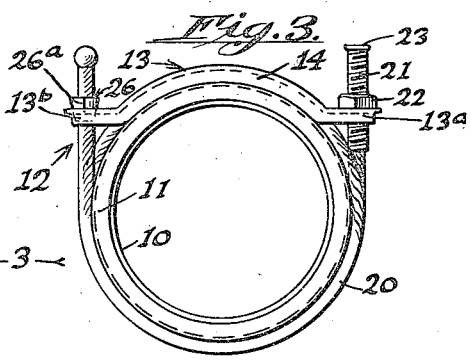
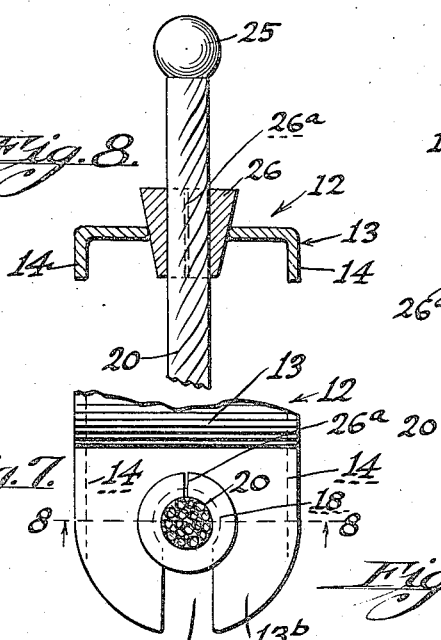
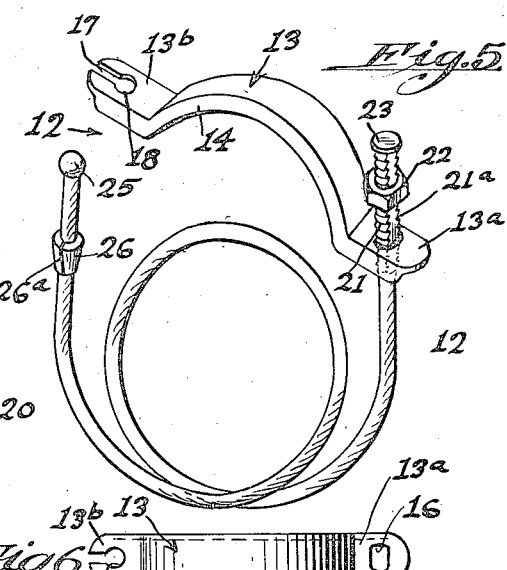
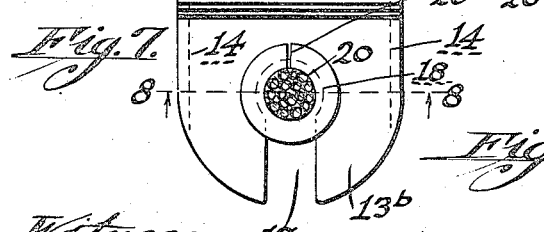
Inventor
P. H. Wilkinson Patented Nov. 4, 1924.

1,514,412

UNITED STATES PATENT OFFICE.

PAUL H. WILKINSON, OF LOS ANGELES, CALIFORNIA.

HOSE CLAMP.

Application filed February 19, 1924. Serial No. 693,753.

*To all whom it may concern:*

Be it known that I, PAUL H. WILKINSON, a citizen of the United States, residing at Los Angeles, in the county of Los Angeles and State of California, have invented new and useful Improvements in Hose Clamps, of which the following is a specification.

This invention relates to clamps, and particularly to clamps adapted to couple two cylindrical members, such, for example, as two pieces of hose, or a piece of hose and a pipe, and it has for one of its objects the provision of an adjustable clamp, simple in construction, positive and effective in action and readily attachable to, and detachable from the parts to which it is applied, the clamp comprising a transverse yoke and a flexible cable and being an improvement on the clamp described and claimed by me in Patent No. 1,413,818, issued April 25, 1922.

With the foregoing object in view, together with such other objects and advantages as may subsequently appear, my invention resides in the construction and arrangement of parts hereinafter described and claimed and illustrated in the accompanying drawings, in which:

Figure 1 may be regarded as a plan view showing my improved clamp as the same may be employed in securing a hose to a pipe, Fig. 2 may be regarded as a side elevation of the parts shown in Fig. 1, Fig. 3 is an end view looking in the direction of the arrow 3 of Fig. 2, Fig. 4 is a section taken on the line 4—4 of Fig. 1, Fig. 5 is a perspective view of my improved clamp which employs a yoke for fastening the ends of a looped cable, Fig. 6 is a plan view of the yoke shown in Fig. 5, Fig. 7 is a plan view of an end portion of the yoke shown in Figs. 5 and 6, and showing in section a cable which engages the yoke, and Fig. 8 is an enlarged section taken on the line 8—8 of Fig. 7.

Referring to the drawings for a more detailed description thereof, the numeral 10 indicates a nipple, an end portion of which is inserted into an end portion of a hose 11, the nipple and the hose being clamped together, as shown in Figs. 1, 2, 3 and 4, by a clamp 12 comprising a yoke 13 which is preferably rigid and of bow shape, and is provided at each side with a downwardly extending flange 14 which form a longitudinal groove or recess on the inner face of the yoke. The groove or recess is of less depth than the diameter of the cable and is adapted to receive the cable so that when the yoke is drawn against the hose, that portion of the cable in the groove of the yoke will be pressed firmly and tightly into the hose, thereby securely binding the hose to the pipe and forming a joint that will stand a substantially uniform pressure around its entire circumference without leaking. An end portion 13$^a$ of the yoke 13 is provided with an aperture 16 which is preferably non-circular. The opposite end portion 13$^b$ of the yoke 13 has a slot 17 extending inwardly from the end of the yoke and continuous with a circular aperture 18, the diameter of which is greater than the width of the slot 17. The aperture 18 is tapered, the smaller diameter of the taper being on the inner face of the yoke.

The clamp 12 also comprises a flexible cable 20, one end of which is inserted in, and secured to as by brazing, a tubular threaded member 21, which extends through the aperture 16 of the yoke 13. The member 21 has a flat face 21$^a$, as shown in Fig. 5, there being no threads on this face. Such formation of the member 21 prevents its rotation in the aperture 16, the sides of which more or less closely fit the member 21. It will be understood that the member 21 may have more than one flat face or have any other form of periphery which will prevent its rotation in the aperture 16. A nut 22 which may be, for example, a hexagon or wing nut, threadedly engages the member 21 and the latter is peened over at its upper end, as shown by the numeral 23 for the purpose of preventing the loss of the nut 22. The other end of the cable 20 is preferably provided with a knob 25 to prevent the loss of a tapered member 26 which encircles the other end portion of the cable 20. The tapered member 26 is split longitudinally, forming a space 26$^a$.

In adjusting the clamp 12 over the hose 11, the cable 20 is completely looped around the hose and the cable is fitted into the yoke 13 between the flanges 14. A portion of the cable just below the tapered member 26 is then passed through the slot 17 and into the tapered aperture 18. The tapered member 26 is then pushed downwardly into the tapered aperture 18, and by reason of the taper of the member 26 and the taper of the peripheral surface bounding the aperture 18, the member 26 is securely seated to prevent its being pulled downwardly through the aperture 18. To tighten the clamp, the nut 22 on the threaded member 21 is screwed down on to the face of the end portion 13ª of the yoke 13. As the bolt 22 tightens the clamp, the grip of the tapered member 26 on the cable 20 will progressively increase in intensity due to the fact that the member 26 is split and the cable 20 is thus prevented from slipping.

While I have herein described one form of my invention, modifications thereof may be devised without departing from the spirit thereof, and it is to be understood that such modifications come within the scope of this invention.

What is claimed is:

1. A clamp comprising a completely looped cable and a bow-shaped yoke having a longitudinally extending groove therein of less diameter than the cable, the cable passing through the groove, means for fastening an end of said cable to an end of said yoke, said means comprising an end-peened threaded member secured to an end of the cable and passing through an aperture in one end of said yoke, said threaded member being non-rotatable in said aperture and a nut engaging said threaded member and positioned between the peened end of said threaded member and the outer face of said yoke and means for fastening the other end of said cable to the other end of said yoke, the second means comprising an inverted cone-shaped member split longitudinally and encircling the other end of said cable, said cone-shaped member being seated in a tapered aperture formed in the other end of said yoke.

2. A clamp comprising a completely looped cable and a bow-shaped yoke having a longitudinally extending groove therein of less diameter than the cable, the cable passing through the groove, means for fastening an end of said cable to an end of said yoke, said means comprising an end-peened threaded member secured to an end of the cable and passing through an aperture in one end of said yoke, said threaded member being non-rotatable in said aperture and a nut engaging said threaded member and positioned between the peened end of said threaded member and the outer face of said yoke and means for fastening the other end of said cable to the other end of said yoke, the second means comprising an inverted cone-shaped member split longitudinally and encircling the other end of said cable, said cone-shaped member being seated in a tapered aperture formed in the other end of said yoke, said tapered aperture being continuous with a slot formed in an end portion of the yoke whereby the other end of the cable may be disengaged from said yoke.

3. A clamp comprising a completely looped cable and a bow-shaped yoke having a longitudinally extending groove therein of less diameter than the cable, the cable passing through the groove, means for fastening an end of said cable to an end of said yoke, said means comprising a threaded member secured to an end of the cable and passing through an aperture in an end of said yoke and a nut engaging said threaded member and means for fastening the other end of said cable to the other end of said yoke, the second means comprising a tapered member encircling a portion of the cable and adapted to be seated in an aperture formed in the other end of said yoke.

4. A clamp comprising a completely looped cable and a bow-shaped yoke having a longitudinally extending groove therein of less diameter than the cable, the cable passing through the groove, means for fastening an end of said cable to an end of said yoke, said means comprising a threaded member secured to an end of the cable and passing through an aperture in an end of said yoke and a nut engaging said threaded member and means for fastening the other end of said cable to the other end of said yoke, the second means comprising a tapered member encircling a portion of the cable and adapted to be seated in an aperture formed in the other end of said yoke, said tapered member being split longitudinally.

5. A clamp comprising a completely looped cable and a bow-shaped yoke having a longitudinally extending groove therein of less diameter than the cable, the cable passing through the groove, means for fastening an end of said cable to an end of said yoke and for tightening the clamp, and means for fastening the other end of said cable to the other end of said yoke, the second means comprising a tapered member encircling a portion of the cable and adapted to be seated in an aperture formed in the other end of said yoke, said tapered member being split longitudinally.

6. A clamp comprising a completely looped cable and a bow-shaped yoke having a longitudinally extending groove therein of less diameter than the cable, the cable passing through the groove, means for fastening an end of said cable to an end of said yoke and for tightening the clamp and means for fastening the other end of said cable to the other end of said yoke, the second means comprising a tapered member encircling a portion of the cable and adapted to be seated in an aperture formed in the other end of said yoke, said tapered member being split longitudinally, the other end of said yoke having a slot formed in an end portion thereof, said slot being continuous with the aperture in which said tapered member is seated.

7. A clamp comprising a completely looped cable and a bow-shaped yoke having a longitudinally extending groove therein of less diameter than the cable, the cable passing through the groove, means for fastening an end of said cable to an end of said yoke and for tightening the clamp, said means comprising a peened threaded member secured to an end of the cable and passing through an aperture in an end of said yoke, and a nut engaging said threaded member, means for fastening the other end of said cable to the other end of said yoke, the second means comprising a tapered member encircling a portion of the cable and adapted to be seated in a tapered aperture formed in the other end of said yoke, said tapered member being split longitudinally, the other end of said yoke having a slot formed in an end portion thereof, said slot being continuous with the tapered aperture in which said tapered member is seated, said slot being of smaller width than the diameter of said tapered aperture, and means for retaining said tapered member on said cable.

In testimony whereof I have signed my name to this specification.

PAUL H. WILKINSON.